United States Patent Office 3,537,240
Patented Nov. 3, 1970

3,537,240
AIR INTAKE APPARATUS FOR A JET-PROPULSION AIRCRAFT
Hans Weidinger, Ottobrunn, and Rolf G. Sturm, Munich, Germany, assignors to Entwicklungsring Sud GmbH, Munich, Germany
Filed Dec. 11, 1967, Ser. No. 689,494
Claims priority, application Germany, Dec. 22, 1966, E 33,078
Int. Cl. B01d 46/00
U.S. Cl. 55—306                                        6 Claims

ABSTRACT OF THE DISCLOSURE

The disclosed apparatus is particularly adapted for cooperation with the intake orifice of a jet-propulsion engine of a vertical take-off and landing aircraft and includes a grid screen which serves to prevent the intake of debris and other foreign matter during take-off and landing of such aircraft. A cylindrically-shaped grid screen is positioned adjacent the intake orifice of the jet-propulsion engine and coaxial therewith. A nose cone or shield is secured to the outer edge of the grid screen. Means are included for axially moving the nose shield from a first position adjacent the intake orifice to a second extended position so as to selectively permit air flow through the grid screen into the engine. During vertical take-off or landing, the nose shield is shifted to its extended position, whereas during cruise flight the cone is held adjacent the intake orifice of the intake pipe so as to block the flow of air therethrough.

BACKGROUND OF THE INVENTION

This invention generally relates to an apparatus for controlling the air intake to a jet-propulsion engine and more particularly relates to such an apparatus which includes a screen grid for filtering the inflow to such a jet engine so as to prevent the intake of debris and additionally includes a means for selectively obstructing a portion of the input of such engine during selected flight conditions.

An ever present danger during the operation of vertical take-off and landing aircraft is that debris and various foreign substances of considerable size and weight are often whirled up within the range of the intake air jet of the lift fans and frequently introduced into the air intake system causing considerable damage to the engines.

In the construction of vertical take-off and landing aircraft, it is advantageous to install the gas generators adjacent and as close as possible to the lift fans so as to keep the turbulence losses in the gas pipes to a minimum value. In accordance with this constructional approach, the air intake orifice of the jet engine lies within the range of the debris injections which are whirled up. A similar situation occurs with regard to the intake for the lift engines. In accordance with the illustrated embodiment, an air intake apparatus particularly adapted for use with a jet-propulsion aircraft includes a screen grid which filters the air intake so as to avoid the passage of debris into the engine. The illustrated apparatus further includes a means for allowing the flow of intake air into the engine during vertical take-off and landing and thereafter permitting closure of the intake orifice during cruise flight.

In accordance with conventional practice, the aircraft gas generators are positioned within pods which are mounted to the aircraft wings, and the intake orifices to the generators are covered with a protective cap or cone for disablement during cruise flight. During vertical take-off and landing, the protective cone is shifted axially away from the intake orifice to permit air intake into the engine. In accordance with the illustrated embodiment, the effective surface area of the intake orifice is covered with a screen grid or mesh which is affixed to the shield and is coaxially slidable within the intake pipe. Upon movement of the protective shield axially away from the intake orifice, the grid screen is exposed and air is allowed to flow therethrough into the engine.

The screen or filter grid in the preferred embodiment is cylindrically shaped. However, should the particular aircraft construction require the use of a protective shield or cap which is hingedly secured to the surface of the craft rather than being shiftable along an axis, the grid screen may take other tubular shapes, for example, the shape of an elbow, as illustrated in the alternate embodiment. Serving to shift the protective shield in the preferred embodiment are a pair of hydraulically-actuated piston devices the longitudinal axes of which are positioned generally parallel to the path of movement of the shield. Additionally, in accordance with the preferred embodiment, the longitudinal ribs of the cylindrical screen grid are adapted to serve as slides or guide ribs which provide a sliding outer surface for movement along the inner surface of the intake pipe.

It is a main object of this invention to provide an air intake apparatus for an aircraft propulsion engine which serves to minimize the intake of debris and other foreign substances into the engine. It is an additional object of this invention to provide an air intake apparatus for the vertical propulsion engines of a vertical take-off and landing aircraft which functions to permit the air intake into the engine during the take-off and landing and which permits closure of the intake orifices during cruise flight. Other objects and advantages of the invention will become apparent with reference to the following description and accompanying drawings which show an illustrative embodiment of this invention.

BRIEF DESCRIPTION OF THE DRAWINGS

FIG. 6 is a partial, sectional view of a portion of an aircraft including an alternate embodiment of an intake apparatus including certain features of this invention.

FIG. 7 is a top view of the apparatus of FIG. 6 taken substantially along the arrow Z thereof.

DESCRIPTION OF THE PREFERRED EMBODIMENTS

Figure 1:
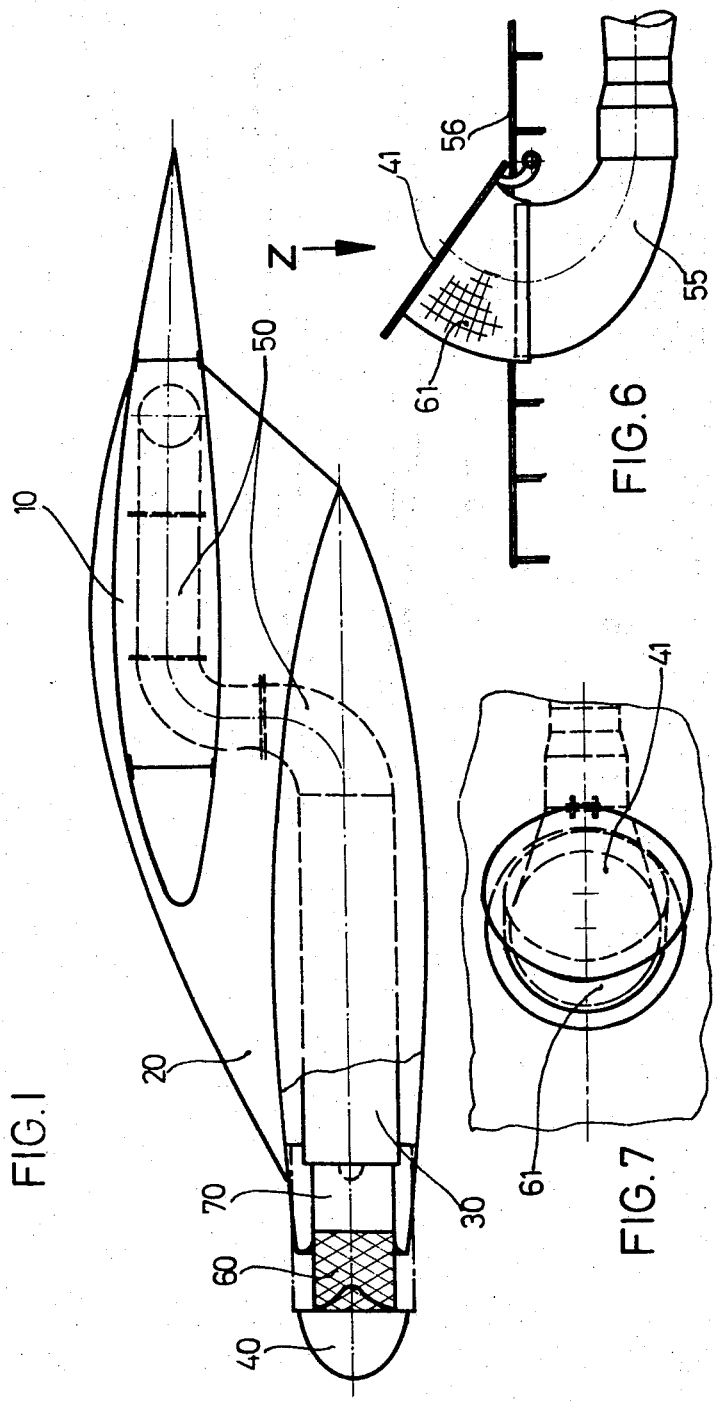
FIG. 1 is a side view of a portion of a jet-propelled aircraft including an air intake apparatus for the propulsion engine embodying certain features of this invention.
Figure 2:
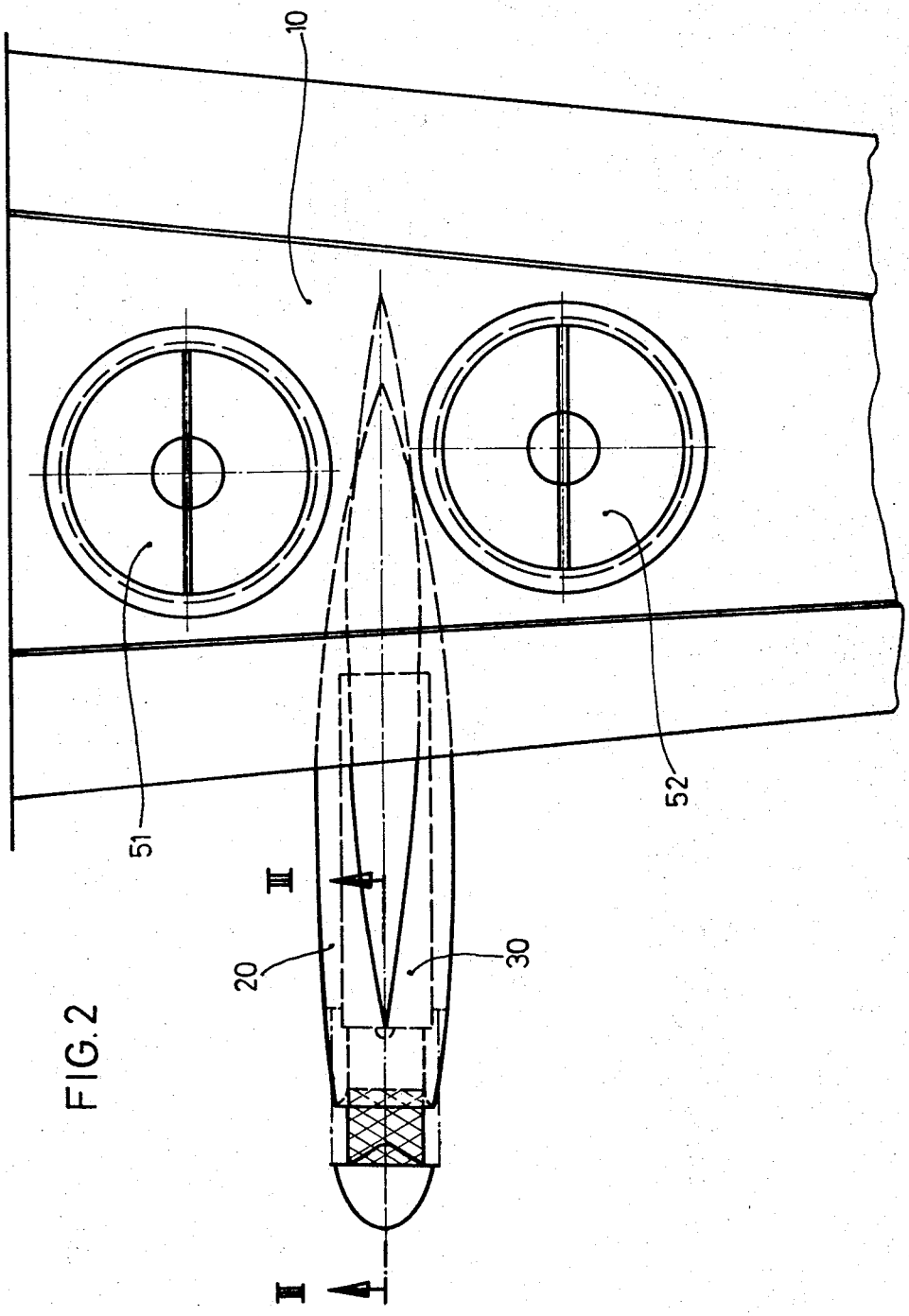
FIG. 2 is a top view of the apparatus illustrated in FIG. 1.
Figure 3:
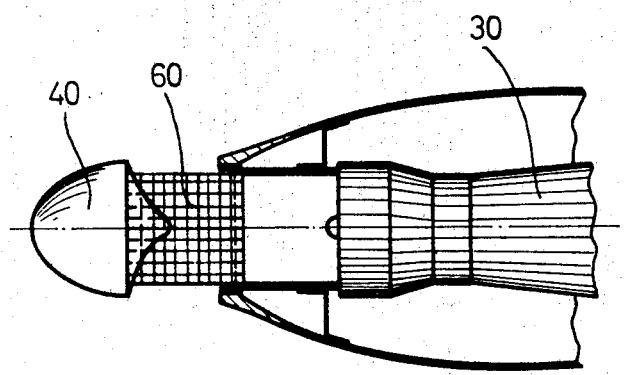
FIG. 3 is a sectional view taken along the line III—III of FIG. 2.

With reference in particular to FIGS. 1 and 2, a gas generator 30 is illustrated which is installed in an engine pod 20 mounted upon a wing 10 of a jet-propelled aircraft. The intake orifice of the generator 30 is provided with a cone or shield 40 which is axially shifted to an extended position away from the intake orifice during take-off and landing to permit the flow of air into the generator 30. An intake pipe 50 is provided which conducts the air from the generator 30 to a pair of turbine-driven wing fans 51 and 52 mounted in the wing 10. As previously mentioned, an intake orifice 70 of the gas generator 30 is provided with a shield 40 which is connected to a rigid cylindrical screen grid 60. The outer diameter of the screen grid 60 is slightly less than the inner diameter of the intake orifice 70 so as to permit coaxial positioning of the screen grid 60 therein during cruise flight in a manner hereinafter to be more completely described. One edge of the cylindrical screen grid is secured to the inner surface of the nose cone so that upon movement of the nose cone away from the orifice 70, the screen grid will correspondingly be moved axially outwardly from the intake orifice so as to permit intake air to pass through the screen grid for filtering before reaching the generator.

Figure 4:
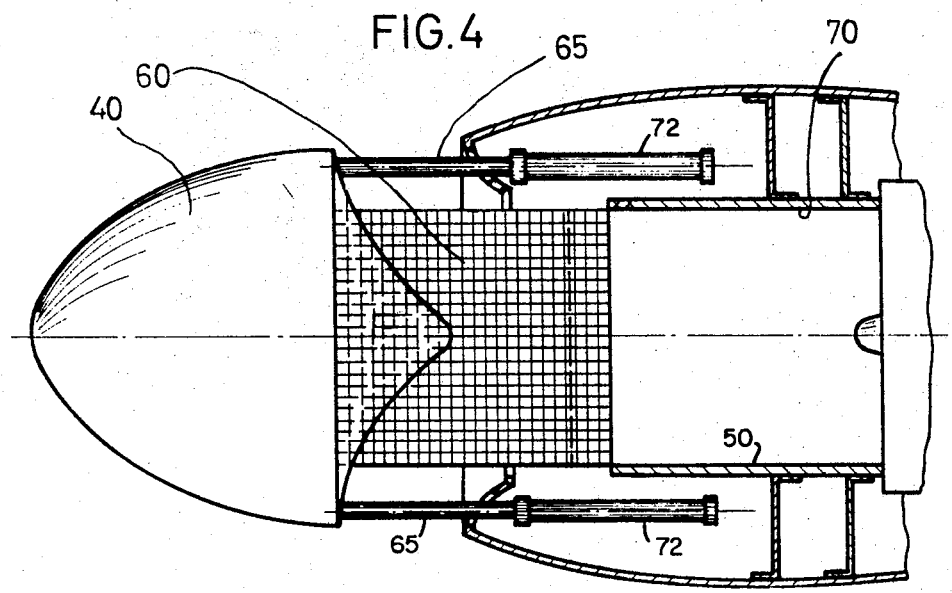
FIG. 4 is an enlarged view of the apparatus of FIG. 3 which illustrates in greater detail the positioning means provided for moving the protective shield with relation to the intake orifice.

With reference to FIG. 4, one method of displacing the protective shield 40 with respect to intake orifice 70 is shown. Pistons 65 are slidably disposed within cylinders 72 such that shield 40 is maintained in proper position as it is moved horizontally to vary the amount of air taken in through screen grid 60.

Figure 5:
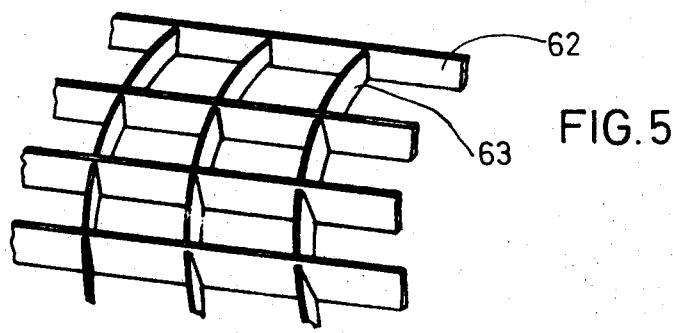
FIG. 5 is an enlarged, fragmentary view of a component of the apparatus illustrated in FIG. 4.

With reference to FIG. 5, the screen grid is composed of a plurality of longitudinal ribs 62 secured at right angles to arcuately-shaped transverse fins 63. The outer surfaces of the ribs 62 and the fins 63 are adapted to serve as guides for sliding contact with the inner casing of the intake pipe 50. The ribs 62 and the fins 63 comprising the screen grid 60 are preferably constructed of stainless steel or are alternately molded of a plastic material so as to facilitate fabrication by injection die casting. The use of such plastic materials is preferably selected to exhibit a low frictional coefficient so as to facilitate the sliding movement of the screen grid 60 within the casing of the intake pipe 50.

The alternate embodiment illustrated in FIGS. 6 and 7 is particularly adapted for use with aircraft wherein the gas generators are installed in the fuselage of the aircraft and air is drawn into the engines during take-off and landing. With regard to FIG. 6, an intake pipe 55 is illustrated which serves to connect a gas generator or lift engine (not shown) to the exterior surface of the aircraft defined by a fuselage shell 56. Positioned about the input orifice of the intake pipe 55 for slidable movement with respect thereto is an elbow-shaped screen grid 61. The exterior end of the elbow 61 is secured to one surface of a flap or shield 41 which is hingedly secured to the surface 56 as illustrated in FIG. 6. Thus, rotational movement of the flap 41 in a clockwise manner as viewed in FIG. 6 displays the mesh elbow 61 to the atmosphere and permits the flow of intake air through the mesh to the engines.

Although two embodiments of the invention have been described in detail, it is to be understood that various changes, substitutions, and alterations can be made therein without departing from the spirit and scope of the invention as defined by the following claims.

What is claimed is:

1. In combination with a jet-propulsion aircraft engine, an air intake apparatus comprising a jet-propulsion aircraft engine air intake pipe defining an intake orifice, a shield, an elongated, continuous, tubular screen the cross section of which defines an area of a size and shape similar to the size and shape of the intake orifice defined by the intake pipe, one end of said screen being secured to one surface of said shield, and means secured to said shield and located adjacent the exterior surface of said tubular screen for guiding said shield and said screen along a path fixed with respect to the intake pipe from a first position locating said shield for obstruction of the orifice defined by said intake pipe and to a second position locating said screen so as to assure the flow of air through said screen prior to entry into the intake pipe.

2. An apparatus in accordance with claim 1 wherein said screen grid is cylindrically shaped and coaxially positioned for slidable, axial movement within said pipe adjacent the intake orifice of said engine.

3. An apparatus in accordance with claim 2 wherein said guidance means is in the form of a hydraulically operable piston with the longitudinal axis of said piston being positioned along a path substantially parallel to the axis of said air intake pipe.

4. An apparatus in accordance with claim 3 wherein said screen grid includes longitudinal ribs substantially parallel to the axis of the cylinder formed by said screen, the outer surfaces of said longitudinal ribs being in contact with and sliding along the inner surface of said intake pipe during movement of the screen grid.

5. An apparatus in accordance with claim 1 wherein said screen is shaped in the form of a cylindrical elbow.

6. An apparatus in accordance with claim 5 wherein said guidance means is in the form of a hinge secured to said shield adjacent the exterior surface of said screen.

References Cited

UNITED STATES PATENTS

| 153,407 | 7/1874 | Waitt | 55—328 |
|---|---|---|---|
| 896,939 | 8/1908 | Roberts | 137—547 X |
| 947,170 | 1/1910 | Williams | 210—122 |
| 1,312,761 | 8/1919 | Starnes | 55—422 X |
| 2,010,568 | 8/1935 | Simpson | 98—2.1 |
| 2,928,497 | 3/1960 | Stockdale | 55—306 |
| 2,969,941 | 1/1961 | Hobart | 55—306 |
| 3,016,109 | 1/1962 | Howard | 55—294 |
| 3,280,537 | 10/1966 | Hagendoorn | 55—422 X |
| 3,302,396 | 2/1967 | Robbins | 60—39.09 |
| 3,347,496 | 10/1967 | Opfer | 244—53 |

FOREIGN PATENTS

| 192,558 | 2/1923 | Great Britain. |
| 1,204,525 | 8/1959 | France. |

DENNIS E. TALBERT, JR., Primary Examiner

U.S. Cl. X.R.

55—351, 385, 418, 422, 468, 529; 60—39.09; 137—547; 230—132